United States Patent [19]

Schulte

[11] Patent Number: 5,029,262
[45] Date of Patent: Jul. 2, 1991

[54] VARIABLE THRESHOLD, DIRECTIONAL NEUTRON SENSOR

[75] Inventor: Robert L. Schulte, Port Washington, N.Y.

[73] Assignee: Grumman Aerospace Corporation, Bethpage, N.Y.

[21] Appl. No.: 559,071

[22] Filed: Jul. 30, 1990

[51] Int. Cl.$^5$ .............................................. G01T 3/08
[52] U.S. Cl. ......................... 250/370.05; 250/370.06; 250/370.1; 250/390.01; 250/390.12
[58] Field of Search ...................... 250/390.12, 390.07, 250/390.01, 370.10, 370.05, 370.09, 370.06; 376/153

[56] References Cited

U.S. PATENT DOCUMENTS 4,516,028 5/1985 Riggan .......................... 250/370.05

Primary Examiner—Edward P. Westin
Assistant Examiner—James Beyer
Attorney, Agent, or Firm—Pollock, VandeSande & Priddy

[57] ABSTRACT

A neutron sensor comprises stacks of multi-layered segments. Each segment includes a first layer having a variable energy threshold for varying the sensitivity of the layer to low energy recoil protons. Immediately adjacent the threshold layer are two directional layers which produce output signals dependent upon the energy loss of recoil protons passing therethrough. The output signals generate a pattern which corresponds to the direction of neutron flow through the sensor.

5 Claims, 2 Drawing Sheets

VARIABLE THRESHOLD, DIRECTIONAL NEUTRON SENSOR

FIELD OF THE INVENTION

The present invention relates to directional neutron detectors, and more particularly to such a detector employing a variable threshold silicon layer.

CO-PENDING APPLICATION

This application relates to the subject matter set forth in my co-pending application Ser. No. 07/513,978, filed Apr. 24, 1990, and assigned to the present assignee.

BACKGROUND OF THE INVENTION

In many scientific applications, it is necessary to distinguish the direction of passing neutrons. Traditionally, this has been a difficult thing to do inasmuch as neutrons are neutrally charged and therefore do not, by themselves, produce an electrical ionization in materials.

The prior art includes a number of detectors utilizing a converter layer of hydrogenous material, such as polyethylene adjacent to a silicon detector. When a neutron of sufficient energy passes through the hydrogenous layer, one or more protons will be liberated and the passage of these protons through the silicon layer results in the generation of a measurable electrical potential. However, these basic structures are only capable of detecting the presence of neutron flux, but are incapable of distinguishing the direction of this flux.

A recent concept proposed by Los Alamos National Laboratory incorporates a stacked structure of single alternating hydrogenous and silicon layers. The direction of incidence for a neutron can be deduced by measuring the track and total energy of a recoil proton as it passes through the detector. However, the concept requires a very highly segmented detector (e.g. microstrips) and copious signal processing as well as data analysis.

My previously mentioned co-pending application achieves directionality by unambiguously determining whether each neutron event is incident from the front or rear of the detector, with minimum signal processing and data analysis. In my prior invention hydrogenous layers are separated by stacked silicon particle detectors. An incident neutron passing through a first layer of hydrogenous material liberates a proton which then passes through the stacked particle silicon detector layers and deposits energy in each layer, the amount of which depends upon the thickness of a silicon layer and the proton-stopping power thereof. The signals produced by the silicon detectors are proportional to the energy loss in the detector layers and these will vary as the proton loses more and more energy during its travel through the silicon detector layers. Thus, a pattern of energy loss is established through the stack of silicon layers which, in turn, is indicative as to whether the neutron producing the recoil proton has entered the detector from a front direction or a rear direction. This determination may be made relatively simply and without the necessity of measuring the track and total energy of a recoil proton as it passes through the detector, as is the case with the most relevant prior art.

Although my prior invention operates satisfactorily, it relies upon the inclusion of more than three silicon detectors in each segment of a detector stack. This is a costly construction and adds to the size of a necessary unit. Also, the sensitivity or thresholding for my prior design required the switching of individual silicon detector layers from active to de-active states. This thresholding is therefore quantized in coarse, discrete levels.

BRIEF DESCRIPTION OF THE PRESENT INVENTION

The present invention is an improvement of my design in the mentioned co-pending application. Rather than using individually switched detector layers, the present invention employs a single threshold layer in each segment of stacked layers, followed by two identical directional layers. The threshold layer has a selectable variable bias applied thereto so that the thickness of the active and inactive region of the threshold layer may be varied. This achieves a continuously variable threshold which can eliminate low energy neutrons. By measuring the electrical output from the threshold and directional layers, it is possible to distinguish between neutrons incident from the front or the rear of the stacked layers. The end result is an improvement in sensitivity of the overall unit with minimal signal processing and data analysis. Substantial cost savings are also realizable due to the fact that the present invention utilizes fewer silicon detector layers to determine the direction of incident neutrons.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Prior to discussing the invention in detail, a short review of the most relevant prior art will be discussed in connection with FIG. 1. Typically, an incident neutron passes through a converter member which, as previously explained, may be a hydrogenous material such as polyethylene which freely liberates a proton in response to an incident neutron collision. After collision, the scattered neutron will most often deflect from its original path. Likewise, a liberated or recoil proton will be propelled at an angle Θ relative to the original path of the incident neutron. The recoil proton can be optionally subjected to a filter or absorber layer, such as aluminum or carbon, for absorbing low energy recoil protons so as to increase the signal-to-noise ratio of the detector. The actual detector layer indicated is preferably a silicon layer which will develop an ionization region when subjected to energy loss by the recoil proton traversing the detector layer. The presence of the ionization region produces an electrical signal which is indicative of neutron detection. However, this basic prior art structure is incapable of determining the direction of the neutron.

Figure 1:
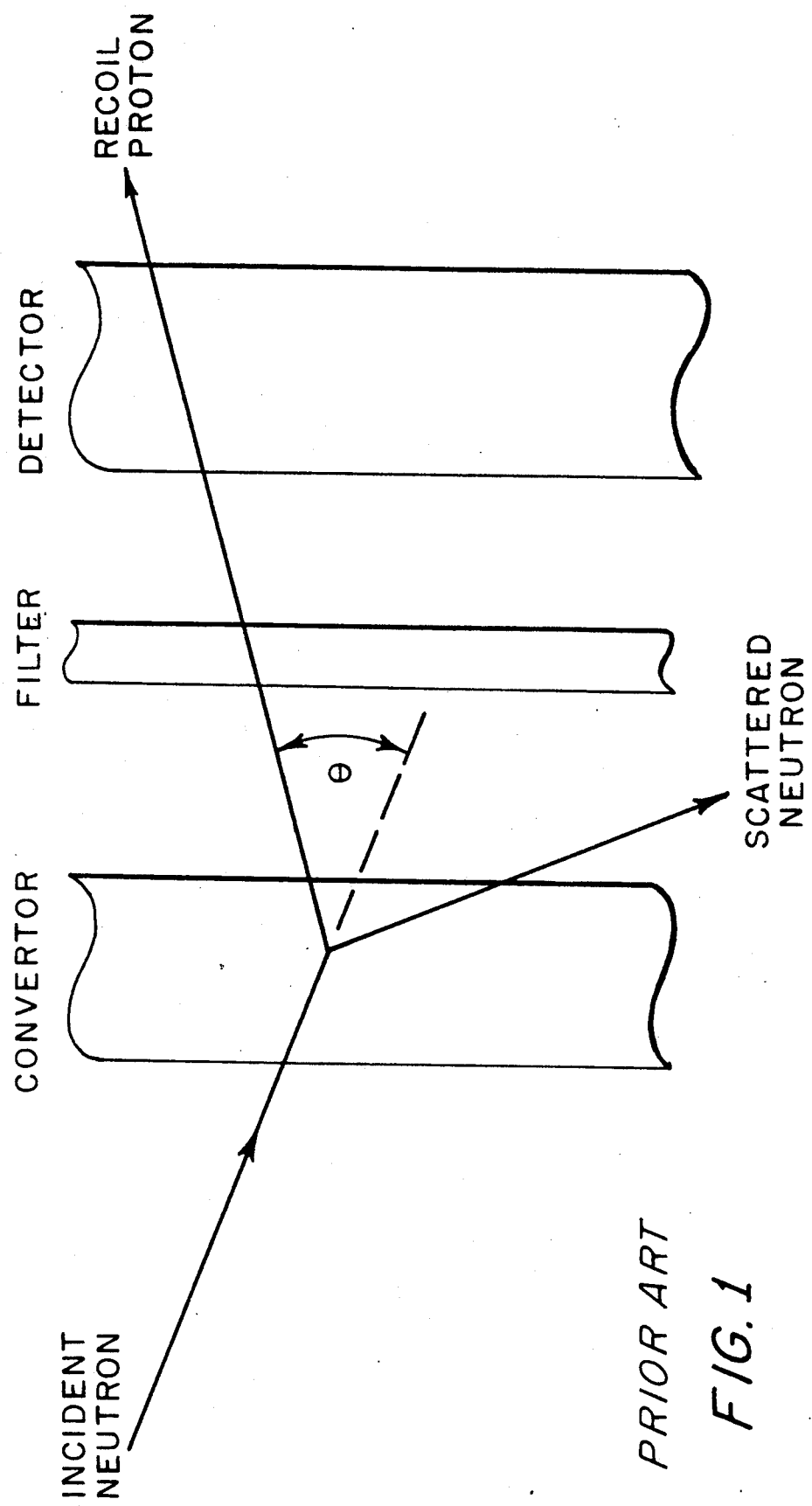
FIG. 1 is a basic diagrammatic view of the prior art.

More relevant prior art is that previously referenced in connection with the concept of the Los Alamos National Laboratory wherein the structure shown in FIG. 1 is repeated on a very fine scale both laterally and in tandem so that there are adjacent repeating units each consisting of converter and detector layers. However, as previously explained the concept requires the tracking of the recoil protons between succeeding detector layers; and this results in a highly segmented detector requiring copious signal processing and data analysis.

Figure 2:
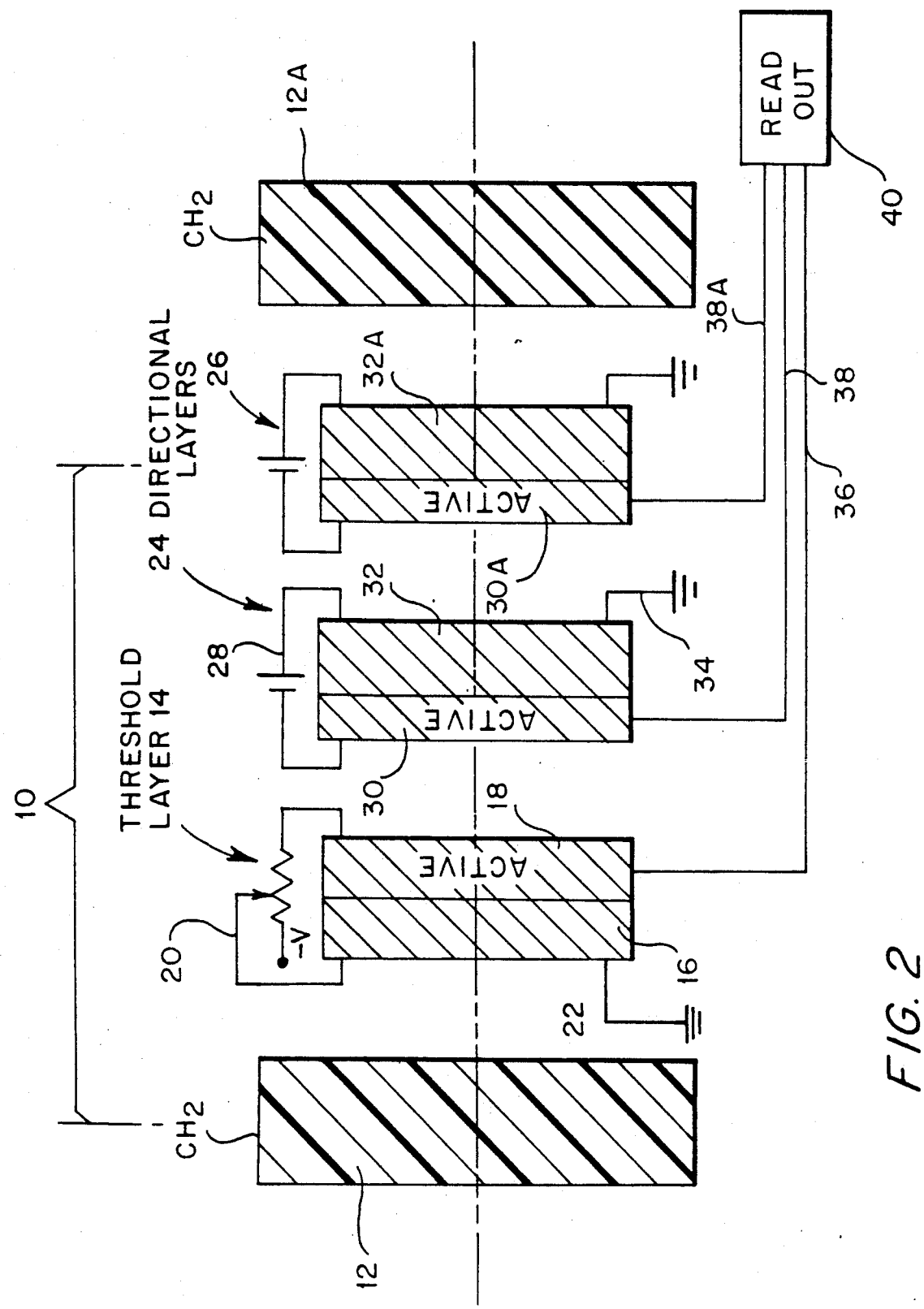
FIG. 2 is a diagrammatic sectional view of the present invention.

FIG. 2 shows the improvement of the present invention. One complete segment is illustrated and is generally indicated by reference numeral 10. It is to be understood that a complete sensor unit includes additional segments stacked before and after the segment illustrated in FIG. 2. As in my previous invention, the present design uses the pattern of energy loss of a recoil proton between adjacently positioned silicon detector layers to determine the direction that neutrons are impacting. Generic to this invention and my previously mentioned invention is the utilization of a hydrogenous material, preferably polyethylene, as a first layer 12. An incident neutron dislodges a proton from the polyethylene ($CH_2$) material. The recoil proton passes through an adjacently located threshold layer 14 which has an inactive region 16 and an active region 18 due to the connection of a reverse bias voltage across the major surfaces of the threshold layer 14. The relative thicknesses of the active and inactive regions will vary depending upon this bias voltage. The right indicated surface of the threshold layer 14 is grounded at 22. By increasing the thickness of the threshold layer active region 18, the segment 10 has its energy threshold decreased, thereby making the segment 10 more sensitive to incoming neutrons of lower energy. However, in the event that incoming neutrons of relatively low energy interfere with the detection of high energy neutrons, the threshold may be increased by varying the reverse bias across the threshold layer 14 thereby increasing the thickness of the inactive region 18. The recoil protons of low energy cannot penetrate through the thicker inactive region. Only higher energy recoil protons from high energy neutron collisions enter the active region 18; the variable threshold thereby makes the segment 10 insensitive to low energy neutrons and retains sensitivity to high energy neutrons. The adjustment of the threshold level can be made as fine as the bias voltage level increment. If the sensor is measuring high energy incoming neutrons, it is desirable to adjust the threshold upward so that the sensitivity of the threshold layer 14 becomes decreased. This results in the non-measurement of low energy protons, the latter resulting from initial collision with low energy neutrons representing noise. Accordingly, a proper adjustment of the threshold level at the threshold layer 14 may result in a greater signal-to-noise ratio for the entire sensor unit. In FIG. 2, the means for applying a variable bias to the threshold layer 14 is diagrammatically illustrated by a simple potentiometer 20. However, it should be recognized that other variable bias application techniques may be employed. Coaxial with the threshold layer 14 and immediately to the right thereof are two directional layers 24 and 26. As in the case of the threshold layer 14, the directional layers are fabricated from silicon material and have their transverse surfaces coated with an appropriate conductor material, such as gold or aluminum. Each of the directional layers has a bias voltage applied between the transverse surfaces so as to create an active region and an inactive region in each directional layer. For example, in connection with the directional layer 24, an active region 30 is created adjacent an inactive region 32. The active region of the threshold layer 14 is located on the right side of that layer while the active region 30 of the directional layer 24 is located on the left side of the latter layer. The right surface of the directional layer 24 is grounded at 34. Protons impacting upon the directional layer 24 create ion-electron pairs and as energy is lost by a proton travelling through the active region 30, a corresponding current is produced which is measurable. A similar structure and operation are obtained with the second directional layer 26 which is coaxially positioned to the right of the directional layer 24. The active region 30A corresponds to the active region of directional layer 24. As protons pass from directional layer 24 to 26, they will lose energy as they penetrate the inactive region 32. This loss of kinetic energy causes a greater generation of ion-electron pairs in the active region 30A than in the active region 30. As a result, a greater measurable current is obtainable from the disassociated electrons in active region 30A. The increase of measurable current from directional layer 24 to directional layer 26 is indicative of the fact that neutrons are travelling from the left to the right as viewed in FIG. 2. This establishes the directionality of neutron flow.

In order to detect the directionality of neutron flow, leads are connected from each of the active regions of layers 14, 24 and 26 to a read out device 40 which measures the current generated in each of the active regions. Assuming neutron flow from the left to the right, the current flowing in lead 38A, connected to active region 30A, will be greater than that of the current flowing in lead 38A connected to active region 30. As a result, a pattern is established of current values in the leads 38 and 38A which corresponds to the directionality of neutron flow. The reverse pattern will exist for a neutron flowing in an opposite direction.

Thus, the present invention involves a detector configuration that uses fewer silicon detector layers to determine the direction of incident neutrons. It employs a pattern of the energy loss of a recoil proton in two directional layers 24, 26, having equal active region thickness, to help determine whether a neutron has impacted from the front or the rear of a sensor. A front end threshold layer 14 is provided with a variable bias capability so that it is possible to provide a variable threshold of measurable sensitivity. The segment 10 is insensitive to neutrons having energies lower than the threshold energy and thereby is useful in a high flux neutron environment. Utilization of the threshold layer 14 minimizes data processing time because the directional layers 24 and 26 of individual segments 10 need not be monitored if the threshold layer 14 of that particular segment does not generate a read out current on lead 36 that is sufficient to exceed a threshold current value. Thus, in effect, the read out 40 need only make comparisons for directional layers of segments wherein a corresponding threshold layer 14 has generated a sufficiently high threshold current.

In view of the fact that neutrons have high penetrating capabilities, a neutron that has not undergone a collision in the hydrogenous layer at the front end of a stack is not immediately detectable in that segment. It may, however, collide with a proton in the middle or rear of the stack. Thus, by stacking a number of segments 10, it will be possible to increase the probability of collision and detect the recoil proton without monitoring the output current from all preceding directional layers and the neutron detection efficiency is thereby increased as the number of segments 10 are increased. When an incident neutron dislodges a proton from a hydrogenous layer 12, 12A, the recoil proton passes through subsequent layers and deposits increasing energy in each layer, as it slows down, which is proportional to the overall thickness of each layer and the thickness of its active region. Output signals produced in each layer are proportional to the energy lost in that particular layer and, as previously mentioned, the signals provide a pattern of energy loss in the directional layers which is indicative of the direction in which the proton is travelling. This, of course, is directly correlatable to the direction of incoming neutrons.

Accordingly, the present invention is an improvement over prior systems in that it uses a single threshold layer 14 in each segment 10 to provide a variable energy threshold and two additional directional layers 24 and 26 to measure the energy loss pattern of recoil protons, thus achieving front-to-back discrimination of incident neutrons.

It should be understood that the invention is not limited to the exact details of construction shown and described herein for obvious modifications will occur to persons skilled in the art.

I claim:

1. In a neutron sensor a repetitive segment comprising:
    a layer of hydrogenous material for producing recoil protons in response to colliding neutrons;
    a first detector layer located adjacent the hydrogenous layer;
    means for establishing variably active and inactive regions of the first detector layer having a variably set detector bias voltage;
    threshold signaling means having a conductor connected to the first detector layer for carrying an electrical signal exceeding a corresponding threshold;
    two parallel spaced second and third detector layers located adjacent the first detector layer;
    means for establishing fixed active and inactive regions of the second and third detector layers having respective fixed detector bias voltages;
    threshold signal sensing means having conductors connected to each of the second and third detector layers for carrying electrical signals indicative of proton energy loss in these layers and consequently detecting a pattern indicative of neutron directionality.

2. The sensor set forth in claim 1 together with means for reading out the electrical signals on the conductors of the second and third layers when the threshold signal occurs.

3. The sensor set forth in claim 1 wherein the hydrogenous layer is fabricated from $CH_2$.

4. A neutron sensor having a repetitive stack of segments, each segment comprising:
    a layer of $CH_2$ material for producing recoil protons in response to colliding neutrons;
    a first silicon detector layer located adjacent the $CH_2$ layer;
    means for establishing variably active and inactive regions of the first detector layer having a variably set detector bias voltage;
    threshold signaling means having a conductor connected to the first detector layer for carrying an electrical signal exceeding a corresponding threshold;
    two parallel spaced second and third silicon detector layers located adjacent the first detector layer;
    means for establishing fixed active and inactive regions of the second and third detector layers having respective fixed detector bias voltages;
    threshold signal sensing means having conductors connected to each of the second and third detector layers for carrying electrical signals indicative of proton energy loss in these layers and consequently detecting a pattern indicative of neutron directionality.

5. The sensor set forth in claim 4 together with means for reading out the electrical signals on the conductors of the second and third detector layers when the threshold signal occurs.

* * * * *